United States Patent Office 3,342,737
Patented Sept. 19, 1967

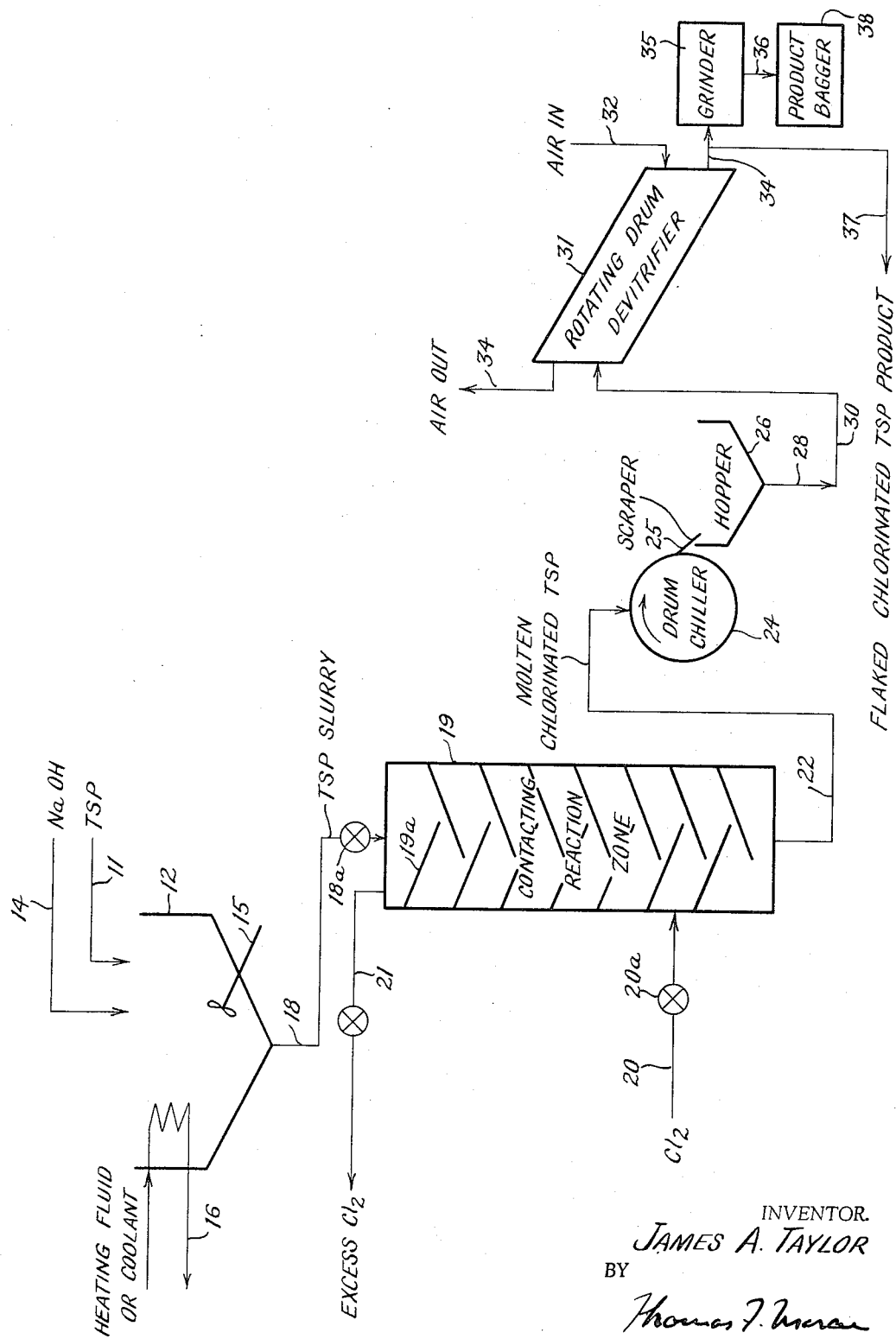

3,342,737
PROCESS FOR MAKING CHLORINATED
TRI-SODIUM PHOSPHATE
James A. Taylor, Rahway, N.J., assignor, by mesne assignments, to Continental Oil Company, a corporation of Delaware
Filed June 11, 1964, Ser. No. 374,409
12 Claims. (Cl. 252—99)

ABSTRACT OF THE DISCLOSURE

Chlorinated tri-sodium phosphate is prepared by reacting sodium hydroxide and tri-sodium phosphate in an amount of water sufficient to dissolve all the sodium hydroxide but not to form the dodecahydrate with all the tri-sodium phosphate, chlorinating the solution, and rapidly cooling the reaction product to form a dry solid.

Cross reference to related application

This application is a continuation-in-part patent application of Ser. No. 48,256 filed Aug. 8, 1960, and now abandoned.

This invention relates to chlorinated tri-sodium phosphate and to a method of preparing same. Chlorinated tri-sodium phosphate, a solid admixture of tri-sodium phosphate, sodium chloride, sodium hypochlorite and water wherein the water is present chemically combined or as water of crystallization, is useful as a combination cleansing-disinfecting agent, the tri-sodium phosphate portion thereof acting as a detergent or cleansing agent and the sodium hypochlorite portion thereof acting as a disinfecting or bleaching agent upon contact with water.

Generally, commercially available chlorinated tri-sodium phosphate is a finely-divided, crystalline material and upon standing tends to harden and become lumpy, particularly upon exposure to moisture or water vapor. Additionally, this material since it is made up of finely-divided crystals tends to be dusty and irritating to personnel handling the same.

It is an object of this invention to provide an improved form of chlorinated tri-sodium phosphate, the chlorinated tri-sodium phosphate being in a substantially non-dusty and flake-like form so as to obviate handling problems associated with finely-divided, crystalline chlorinated tri-sodium phosphate.

It is another object of this invention to provide an improved process for the manufacture of chlorinated tri-sodium phosphate.

Still another object of this invention is to provide a process for the manufacture of chlorinated tri-sodium phosphate wherein the chlorinated tri-sodium phosphate product is recovered in a substantially vitreous, flaky, non-dusty form directly from the reaction mixture wherein the chlorinated tri-sodium phosphate is produced.

Yet another object of this invention is to provide a process for the manufacture of chlorinated tri-sodium phosphate which is adaptable to a batch production operation or to continuous production operation.

Still another object of this invention is to provide a method of preparing chlorinated tri-sodium phosphate wherein the chlorinated tri-sodium phosphate, initially prepared in molten form at a relatively elevated temperature, is cooled and solidified substantially immediately after formation.

How these and other objects of this invention are achieved will become apparent in the light of the accompanying disclosure made with reference to the accompanying drawing wherein there is schematically illustrated a process flow for the manufacture of chlorinated tri-sodium phosphate in accordance with an embodiment of this invention.

In at least one embodiment of the practice of this invention at least one of the foregoing objects will be attained.

In the practice of this invention a flaky, substantially vitreous chlorinated tri-sodium phosphate product is obtained by reacting chlorine with an aqueous fluent admixture containing tri-sodium phosphate and a minor amount, not more than 5% by weight based on the fluent aqueous admixture, of sodium hydroxide. The amount of water in the aqueous fluent admixture is less than that sufficient to form dodecahydrate crystals with all the tri-sodium phosphate therein but sufficient to effect dissolution of the sodium hydroxide therein. By thus controlling the amount of water in the aqueous fluent reaction admixture the resulting produced chlorinated tri-sodium phosphate is recovered, upon cooling substantially immediately after formation, within about 1–15 seconds, directly from the reaction admixture in a substantially dry state. Further, by so controlling the amount of water present in the reaction admixture, a subsequent crystallization step for the recovery of the chlorinated tri-sodium phosphate from a mother liquor is avoided. Preferably, the amount of water present in the aqueous fluent reaction admixture, although sufficient to effect dissolution of any sodium hydroxide present therein, is not sufficient to effect dissolution of all of the sodium phosphate in the reaction admixture in the presence of the sodium hydroxide.

Upon contact with the chlorine the sodium hydroxide present in thhe aqueous admixture substantially instantly and completely reacts with the chlorine to form equimolecular amounts of sodium hypochlorite and sodium chloride. When the sodium hydroxide has been reacted with chlorine to yield the substantially stoichiometric equivalent of sodium hypochlorite, the resulting reaction mixture, now comprising tri-sodium phosphate, sodium hypochlorite and sodium chloride is substantially immediately rapidly chilled or cooled to about room temperature, such as by direct contact or heat exchange with a relatively cold surface. The prompt cooling of the reaction mixture upon formation of the chlorinated tri-sodium phosphate results in a product having a higher available chlorine content since the product is not subjected to an elevated temperature for any appreciable length of time with resulting deterioration or decomposition of the sodium hypochlorite. Upon chilling or contact with the relatively cold surface the reaction mixture solidifies to yield a solid, vitreous product comprising a homogeneous admixture of tri-sodium phosphate, sodium hypochlorite, sodium chloride and chemically combined water of crystallization.

Referring now to the drawing which schematically illustrates an embodiment of the practice of this invention particularly adaptable for the continuous production of chlorinated tri-sodium phosphate, a tri-sodium phosphate solution, such as an aqueous solution of tri-sodium phosphate having a density in the range about 52–53° Baumé is supplied from a suitable source, not shown, via conduit 11 to tank 12. There is separately added to the tank 12 via line 14 sodium hydroxide, such as solid sodium hydroxide, from a source not shown. A mixer 15 is provided within tank 12 to agitate the contents thereof so as to form a homogeneous admixture of tri-sodium phosphate and sodium hydroxide and to aid in the dissolution of the sodium hydroxide. Tank 12 is also provided with a suitable heat exchanger or coil 16 supplied with heating fluid or cooling fluid, as may be required, in order to adjust the temperature of the resulting admixture within tank 12.

Desirably, in the admixture of tri-sodium phosphate and sodium hydroxide within tank 12 the amount of sodium hydroxide therein comprises a minor amount, usually in the range 4.0–4.5 parts by weight sodium hydroxide to 95.5–96 parts by weight tri-sodium phosphate solution equivalent to a 52° Baumé aqueous solution of tri-sodium phosphate.

The admixture within tank 12, after having been adjusted to a suitable temperature, is supplied via line 18 through flow control valve 18a into contacting-reaction zone 19. Contacting-reaction zone 19 is shown as a tower provided with internal baffles 19a therein for downward, cascading flow of the fluent tri-sodium phosphate-sodium hydroxide admixture therein. Into the lower portion of contacting-reaction zone 19 gaseous chlorine is introduced via line 20 through flow control valve 20a. Within contacting-reaction zone 19 the thus-introduced chlorine passes upwardly therethrough in direct countercurrent contact with the downwardly flowing stream of the fluent admixture of tri-sodium phosphate and sodium hydroxide. Upon contact of the chlorine with the fluent admixture within contacting-reaction zone 19 the chlorine substantially instantaneously and completely reacts with the sodium hydroxide therein to form equimolecular amounts of sodium hypochlorite and sodium chloride. The temperature within contacting-reaction zone 19 is maintained high enough, such as by adjusting the temperature of the fluent admixture of tri-sodium phosphate and sodium hydroxide and sodium hydroxide supplied thereto via line 18, so that the reactants and reaction products do not solidify therein. A temperature in the range 70–100° C., preferably about 85° C., is satisfactory. As illustrated in the drawing, any excess gaseous chlorine is recovered from the upper end of contacting-reaction zone 19 via line 21. This excess chlorine, if desired, can be recovered and recycled to the contacting-reaction zone 19 via line 20. The amount of chlorine introduced into contacting-reaction zone 19 should at least be the stoichiometric equivalent of the amount of sodium hydroxide supplied thereto via line 18 in admixture with tri-sodium phosphate.

The resulting reaction mixture of tri-sodium phosphate, sodium chloride, sodium hypochlorite and water, substantially immediately after the completion of the reaction, is continuously withdrawn from the lower end of contacting-reaction zone 19 via line 22 and flowed therein for distribution and direct contact on the chilled surface of rotating drum chiller 24. The surface of drum chiller 24 is maintained at substantially room temperature, e.g., a temperature in the range 20–40° C., by supplying thereto a suitable cooling fluid such as water to maintain by indirect heat exchange relationship the desired surface temperature on drum chiller 24.

Upon contact of the reaction mixture comprising tri-sodium phosphate, sodium chloride, sodium hypochlorite and water with the chilled surface of drum chiller 24, the reaction mixture completely and quickly solidifies to form solid, vitreous chlorinated tri-sodium phosphate. The film of solid, vitreous chlorinated tri-sodium phosphate is removed from the surface of drum chiller 24 by means of scraper blade 25. As the solid, vitreous chlorinated tri-sodium phosphate is removed from the surface 24 by scraper blade 25 the product chlorinated tri-sodium phosphate falls into hopper 26. The chlorinated tri-sodium phosphate from hopper 26 is supplied via lines 28 and 30 to rotating drum devitrifier 31 wherein it is moved in direct countercurrent contact with air at about room temperature supplied via line 32 at one end of devitrifier 31, the air emerging therefrom at the other end of devitrifier 31 via line 34.

Upon contact of the flaky vitreous tri-sodium phosphate with air within devitrifier 31 further cooling of the chlorinated tri-sodium phosphate takes place therein. The residence time of the chlorinated tri-sodium phosphate within devitrifier 31 is relatively short, about 0.1 to about 1.0 hour. Upon contact with the air within devitrifier 31 the vitreous chlorinated tri-sodium phosphate supplied thereto tends to devitrify and lose some moisture, changing from a vitreous and glassy-like material to a white, opaque, flaky solid.

The resulting flaky devitrified chlorinated tri-sodium phosphate can be recovered from devitrifier 31 via lines 34 and 37 as product or supplied via line 34 to grinder 35 for size reduction to a suitable size and then supplied via line 36, preferably together with the addition of a small, minor amount of an anticaking agent, to chlorinated tri-sodium phosphate product bagger 38 wherein it is placed into suitable containers.

The product chlorinated tri-sodium phosphate should contain a minimum of about 3.25% by weight sodium hypochlorite, preferably an amount of sodium hypochlorite in the range 3.75–4.25% by weight. Additionally, the moisture content of the product chlorinated tri-sodium phosphate measured as loss on heating for one hour at 200° C. should be about in the range 47–52% by weight. Additionally, the product chlorinated tri-sodium phosphate should be substantially free of sodium hydroxide. Also, the alkalinity factor or alkalinity of the product chlorinated tri-sodium phosphate, which is a measure of the amount of unreacted sodium hydroxide therein, should be about 1.0 or in the range 0.8–0.98, preferably about 0.95. The theoretical maximum value of the alkalinity factor is 1.0, all the alkalinity in the product being attributable to the tri-sodium phosphate. The alkalinity factor is determined by the formula:

$$\text{Alkalinity Factor} = \frac{T_{mo}}{2(T_{mo} - T_{ph})}$$

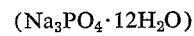

wherein $T_{mo}$ is the titration to methyl orange and $T_{ph}$ is the titration to phenolphthalein. The alkalinity factor determination is carried out by adding 3 gms. of the product to 50 cc. of distilled water, heating to boiling, adding 20 cc. 5% hydrogen peroxide, boiling until the peroxide is all decomposed, cooling, diluting to 75 cc. and titrating with the fifth normal hydrochloric acid to the methyl orange and phenolphthalein end point.

In the above-described embodiment of the practice of this invention made with reference to the drawing herein the use as reactants of 52° Baumé tri-sodium phosphate solution and solid sodium hydroxide is disclosed. Various alternative reactants may be employed. For example, crystals of hydrated tri-sodium phosphate $$(Na_3PO_4 \cdot 12H_2O)$$

may be melted to form an aqueous tri-sodium phosphate solution having a density of 50° Baumé. Water may be then removed from the resulting solution by boiling to yield a solution to have a density of 52° Baumé. If desired, there may be added to the 50° Baumé solution of tri-sodium phosphate a sufficient amount of anhydrous tri-sodium phosphate to yield a 52° Baumé solution.

Although it is generally preferred to employ solid sodium hydroxide, aqueous solutions of sodium hydroxide might also be employed. For example, there may be added to 56° Baumé solution of tri-sodium phosphate a concentrated aqueous solution of sodium hydroxide, about 50% by weight NaOH, in an amount sufficient so that there is present in the resulting admixture 4.0–5.0 parts by weight sodium hydroxide to 95–96 parts by weight equivalent to 52° Baumé solution of tri-sodium phosphate.

In the preparation of the reaction mixture comprising tri-sodium phosphate and sodium hydroxide, it is preferred to employ a tri-sodium phosphate solution having a density in the range 51–54° Baumé, particularly when solid sodium hydroxide is added thereto. If the tri-sodium phosphate solution has a density below 51° Baumé, the resulting chlorinated tri-sodium phosphate product is too wet and unsuitable for direct use as product. When the tri-sodium phosphate solution has a density greater than 54° Baumé, the reaction of chlorine with the sodium hydroxide admixed therein is too slow. If, however, a concentrated aqueous solution of sodium hydroxide is employed instead of solid sodium hydroxide to form the reaction mixture containing tri-sodium phosphate and sodium hydroxide, the density of the tri-sodium phosphate solution may be as high as 56° Baumé. A sufficient amount of concentarted aqueous sodium hydroxide solution, e.g., 50% by weight sodium hydroxide, may be added to yield in the resulting mixture the sodium hydroxide and tri-sodium phosphate in the above-described proportions.

Additionally, instead of employing tri-sodium phosphate and sodium hydroxide directly as the reactants, the reaction mixture for reaction with chlorine may be prepared by reacting sodium hydroxide or sodium carbonate plus sodium hydroxide with orthophosphoric acid in proportions and amounts to yield a resulting reaction mixture containing 4.0–5.0% by weight sodium hydroxide and 95–96 parts by weight equivalent 52° Baumé tri-sodium phosphate solution. It is also possible to prepare the reaction mixture by the addition of di-sodium phosphat and sodium hydroxide, mono-sodium phosphate and sodium hydroxide and/or mono-sodium phosphate plus sodium carbonate and sodium hydroxide.

Upon the formation of the reaction mixture containing the desired proportions of sodium hydroxide and tri-sodium phosphate the reaction mixture is contacted with chlorine, preferably anhydrous gaseous chlorine. The contacting operation, employing chlorine at about room temperature, is carried out at as low a temperature as possible while still maintaining the reaction mixture and resultant reaction product in a fluent condition. The reaction between chlorine and the sodium hydroxide present in the reaction mixture takes place substantially instantaneously, in about several seconds, e.g., about 1–15 seconds, with the formation of a corresponding amount of sodium hypochlorite. The amount of chlorine employed during the contacting operation should be sufficient to react with the sodium hydroxide in the reaction mixture to form the equivalent stoichiometric amount of sodium hypochlorite. It is preferred, however, to employ an excess of chlorine during the contacting operation. The amount of chlorine employed during the contacting operation is about 4.9 parts by weight chlorine to about 100 parts by weight of the reaction mixture comprising tri-sodium phosphate and sodium hydroxide in the above-described proportions. Upon completion of the chlorination reaction the resulting chlorinated tri-sodium phosphate is substantially immediately withdrawn and cooled.

Reference is now made to the accompanying examples which illustrate the practice of this invention.

*Example 1*

To a solution of tri-sodium phosphate having a density of 52° Baumé there is added solid sodium hydroxide in an amount sufficient to form a fluent reaction mixture containing 4% by weight sodium hydroxide and 96% by weight 52° Baumé tri-sodium phosphate solution. It is noted that upon the addition of the solid sodium hydroxide to the tri-sodium phosphate solution crystals of tri-sodium phosphate are precipitated, yielding a creamy slurry. After adjusting the temperature of the resulting slurry or reaction mixture to about 85° C., the reaction mixture is contacted with gaseous chlorine in an amount about 4.5–5.0% by weight based on the resulting reaction mixture. During the reaction between the chlorine and the sodium hydroxide in the reaction mixture, the crystals of tri-sodium phosphate present therein melt to use up most of the heat of reaction yielding a fluent slurry.

Following the chlorine contacting operation the resulting fluent slurry now consisting essentially of a mixture of tri-sodium phosphate, sodium hypochlorite, sodium chloride and water is chilled by direct contact with a cooled metal surface to solidify thereon the chlorinated tri-sodium phosphate. Thereafter, the solidified tri-sodium phosphate is scraped or otherwise removed from the cooled metal surface at a temperature of about 35° C., as a substantially dry, solid, flaky, vitreous product. This product, when thus freshly prepared, is somewhat vitreous or glassy in appearance but upon being passed through a rotating tube or similar conveying device with exposure to air at about room temperature to remove the heat of crystallization, changes into an opaque, flaky, white material. This material can then be packaged directly as product or ground to a powder and packaged.

*Example 2*

There is admixed in a suitable vessel 506 pounds solid sodium carbonate, 418 pounds water and 657 pounds 75% orthophosphoric acid. The resulting admixture is then agitated and heated to boiling for the elimination of carbon dioxide to complete the reaction between the phosphoric acid and sodium carbonate. The resulting reaction admixture is then cooled to about 90° C., and 443 pounds of 50% aqueous sodium hydroxide solution added. The mixture is adjusted to about 90° C., and the density or gravity thereof checked with a Baumé hydrometer on the hot liquor. The density is adjusted to about 52° Baumé by either boiling water away or by the addition of water, whichever is required. When the apparent density reads 52° Baumé on the hot solution, the temperature of the resulting solution is adjusted to 90° C., and 96 pounds of anhydrous flaked sodium hydroxide added. The resulting admixture is then maintained in constant agitation so as to produce a uniform slurry. Thereupon, the admixture is cooled to about 85° C., and maintained at this temperature. The resulting admixture is then metered into a contacting-reaction zone at a rate of about 100 pounds per hour for reaction with gaseous chlorine therein which is metered thereinto at a rate of about 4.1 pounds of chlorine per hour. About 90 pounds of chlorine are required to react completely with the sodium hydroxide in the total reaction mixture.

Chlorinated tri-sodium phosphate product is continuously recovered from the contacting-reaction zone and run directly onto a cooling drum flaker for solidification thereon. The resulting solid vitreous chlorinated tri-sodium phosphate product recovered from the drum flaker analyzes about 4.0–4.1% sodium hypochlorite and, after devitrification, is passed to storage and packaging or for further treatment such as grinding and packaging prior to distribution as product.

As will be apparent to those skilled in the art in the light of the accompanying disclosure, many substitutions and alterations are possible in the practice of this invention without departing from the spirit or scope thereof.

I claim:

1. A method of manufacturing chlorinated tri-sodium phosphate which comprises adding solid sodium hydroxide to a solution of tri-sodium phosphate having a density in the range 51–56° Baumé, the amount of sodium hydroxide added being in the range 4.0–5.0% by weight based on the resulting solution, said resulting solution, after the addition of sodium hydroxide, containing undissolved tri-sodium phosphate, the amount of water in said resulting solution being sufficient to dissolve the sodium hydroxide and not sufficient to effect dissolution of all the sodium phosphate in the presence of the sodium hydroxide, continuously introducing a stream of said resulting solution into a chlorination zone maintained at a temperature in the range 70–100° C., continuously introducing gaseous chlorine into said chlorination zone to contact said stream therein, the chlorine being introduced into the chlorination zone in an amount at least stoichiometrically equivalent to the sodium hydroxide in the stream introduced thereinto, the chlorine reacting with the sodium hydroxide substantially instantly and completely within said chlorination zone to form sodium chloride and sodium hypochlorite, substantially immediately upon completion of the aforesaid chlorination reaction and within a period of time of up to about 15 seconds after said introducing of gaseous chlorine continuously withdrawing in liquid form the resulting reaction mixture containing tri-sodium phosphate, sodium chloride, sodium hypochlorite and water from the chlorination zone and directly rapidly cooling the withdrawn reaction mixture to about room temperature to solidify the same and to form as a substantially dry, homogeneous, solid product chlorinated tri-sodium phosphate containing tri-sodium phosphate, sodium chloride, water and at least about 3.25% by weight sodium hypochlorite.

2. A method of manufacturing chlorinated tri-sodium phosphate which comprises adding solid sodium hydroxide to a 52° Baumé solution of tri-sodium phosphate, the amount of added sodium hydroxide being in the range 4.0–4.5% by weight based on the resulting solution, said resulting solution, after the addition of sodium hydroxide, containing undissolved tri-sodium phosphate, the amount of water in said resulting solution being sufficient to dissolve the sodium hydroxide but not sufficient to effect dissolution of all the sodium phosphate in the presence of the sodium hydroxide, continuously introducing a stream of said resulting solution into a chlorination zone maintained at a temperature in the range 70–100° C., continuously introducing gaseous chlorine into said chlorination zone to contact said stream therein, the chlorine being introduced into the chlorination zone in an amount at least stoichiometrically equivalent to the sodium hydroxide in the stream introduced thereinto, the chlorine reacting with the sodium hydroxide substantially instantly and completely within said chlorination zone to form sodium chloride and sodium hypochlorite, substantially immediately upon completion of the aforesaid chlorination reaction and within period of time of up to about 15 seconds after said introducing of gaseous chlorine continuously withdrawing in liquid form the resulting reaction mixture containing tri-sodium phosphate, sodium chloride, sodium hypochlorite and water from the chlorination zone, directly rapidly cooling the withdrawn reaction mixture to about room temperature by flowing the withdrawn liquid form reaction mixture onto a relatively cold metallic surface to solidify said reaction mixture and to form as a substantially, dry, homogeneous, solid material said chlorinated tri-sodium phosphate containing tri-sodium phosphate, sodium chloride, water and at least 3.25% by weight sodium hypochlorite and removing the resulting-solidified chlorinated tri-sodium phosphate as product from said metallic surface.

3. A method of manufacturing chlorinated tri-sodium phosphate which comprises adding an aqueous solution of sodium hydroxide to a tri-sodium phosphate solution, the amount of added sodium hydroxide being in the proportion about 4.5 parts by weight sodium hydroxide to about 95–96 equivalent parts by weight 52° Baumé solution of tri-sodium phosphate in the resulting solution, said resulting solution, after the addition of sodium hydroxide, containing undissolved tri-sodium phosphate, the amount of water in said resulting solution being sufficient to dissolve the sodium hydroxide and not sufficient to effect dissolution of all the sodium phosphate in the presence of the sodium hydroxide, continuously introducing a stream of said resulting solution into a chlorination zone maintained at a temperature in the range 70–100° C., continuously introducing gaseous chlorine into said chlorination zone to contact said stream therein, the chlorine being introduced into the chlorination zone in an amount at least stoichiometrically equivalent to the sodium hydroxide in the stream introduced thereinto, the chlorine reacting with the sodium hydroxide substantially instantly and completely within said clorination zone to form sodium chloride and sodium hypochlorite, substantially immediately upon completion of the aforesaid chlorination reaction and within a period of time of up to about 15 seconds after said introducing of gaseous chlorine continuously withdrawing in liquid form the resultant reaction mixture containing tri-sodium phosphate, sodium chloride, sodium hypochlorite and water from the chlorination zone, directly rapidly cooling the withdrawn liquid form reaction mixture to about room temperature by flowing the withdrawn reaction mixture onto a relatively cold metallic surface to solidify said reaction mixture and to form as a substantially dry, homogeneous, solid material said chlorinated tri-sodium phosphate consisting essentially of tri-sodium phosphate, sodium chloride, water and at least 3.25% by weight sodium hypochlorite and removing the resulting solidified chlorinated tri-sodium phosphate as product.

4. A method in accordance with claim 3, wherein said tri-sodium phosphate solution has a density in the range 51–56° Baumé.

5. A method in accordance with claim 3, wherein the substantially dry, solid material removed from the metallic surface is treated at substantially room temperature by flowing air in contact therewith and then comminuted.

6. A method of manufacturing chlorinated tri-sodium phosphate which comprises forming a solution of tri-sodium phosphate having a density in the range 51–54° Baumé, adding to said solution a minor amount of solid sodium hydroxide in the range about 4.0–4.5% by weight based on the solution, said resulting solution, after the addition of sodium hydroxide, containing undissolved tri-sodium phosphate, the amount of water in said resulting solution being sufficient to dissolve the sodium hydroxide and not sufficient to effect dissolution of all the sodium phosphate in the presence of the sodium hydroxide, continuously introducing a stream of said resulting solution into a chlorination zone maintained at a temperature in the range 70–100° C., continuously introducing gaseous chlorine into said chlorination zone to contact said stream therein, the chlorine being introduced into the chlorination zone in an amount at least stoichiometrically equivalent to the sodium hydroxide in the stream introduced thereinto, the chlorine reacting with the sodium hydroxide substantially instantly and completely within said chlorination zone, directly upon completion of the aforesaid chlorination reaction and within a period of time of up to about 15 seconds after said introducing of gaseous chlorine continuously withdrawing in liquid form the resulting-reaction mixture containing tri-sodium phosphate, sodium chloride, sodium hypochlorite and water from the chlorination zone, directly rapidly cooling the withdrawn reaction mixture to about room temperature by flowing the withdrawn reaction mixture onto a relatively cold, solid surface to solidify said reaction mixture and to form as a substantially dry, homogeneous solid material said chlorinated tri-sodium phosphate consisting essentially of tri-sodium phosphate, sodium chloride, water and at least 3.25% by weight sodium hypochlorite and removing the resulting solidified chlorinated tri-sodium phosphate as product from said solid surface.

7. A method in accordance with claim 6 wherein the clorination zone is maintained at a temperature of about 85° C.

8. A method in accordance with claim 6 wherein said tri-sodium phosphate solution has a density of about 52° Baumé.

9. A method of manufacturing chlorinated tri-sodium phosphate which comprises providing an aqueous solution of sodium hydroxide and tri-sodium phosphate, said solution containing about 4.0–4.5 parts by weight sodium hydroxide to about 95.5–96.0 parts by weight equivalent 52° Baumé aqueous solution of tri-sodium phosphate, said solution containing undissolved tri-sodium phosphate and the amount of water in said solution being sufficient to dissolve the sodium hydroxide but not sufficient to effect dissolution of all the sodium phosphate in the presence of the sodium hydroxide, continuously introducing a stream of said solution into a chlorination zone maintained at a temperature in the range 70–100° C., continuously introducing gaseous chlorine into said chlorination zone to contact said stream therein, the chlorine being introduced into the chlorination zone in an amount at least stoichiometrically equivalent to the sodium hydroxide in the stream introduced thereinto, the chlorine reacting with the sodium hydroxide substantially instantly and completely within said chlorination zone to form sodium chloride and sodium hypochlorite, substantially immediately upon completion of the aforesaid chlorination reaction and within a period of time of up to about 15 seconds after said introducing of gaseous chlorine continuously withdrawing in liquid form the resulting reaction mixture containing tri-sodium phosphate, sodium chloride and water from the chlorination zone and directly rapidly cooling the withdrawn reaction mixture to solidify the same and to form a substantially dry, homogeneous, solid product chlorinated tri-sodium phosphate consisting essentially of tri-sodium phosphate, sodium chloride, water and an amount of sodium hypochlorite in the range 3.25–4.5% by weight.

10. A method of manufacturing chlorinated tri-sodium phosphate which comprises providing an aqueous solution containing sodium hydroxide and tri-sodium phosphate, said solution containing 4–5 parts by weight sodium hydroxide to about 95–96 parts by weight equivalent 51–56° Baumé aqueous solution of tri-sodium phosphate, said solution containing undissolved tri-sodium phosphate and the amount of water in said solution being sufficient to dissolve the sodium hydroxide but not sufficient to effect dissolution of all the sodium phosphate in the presence of the sodium hydroxide, continuously introducing a stream of said solution into a chlorination zone maintained at a temperature in the range 70–100° C., continuously introducing a gaseous chlorine into said chlorination zone to contact said stream therein, the chlorine being introduced into the chlorination zone in an amount at least stoichiometrically equivalent to the sodium hydroxide in the stream introduced thereinto, the chlorine reacting with the sodium hydroxide substantially instantly and completely within said chlorination zone to form sodium chloride and sodium hypochlorite, directly upon completion of the aforesaid chlorination reaction and within a period of time of up to about 15 seconds after said introducing of gaseous chlorine continuously withdrawing in liquid form the resulting reaction mixture containing tri-sodium phosphate, sodium chloride, sodium hypochlorite and water from the chlorination zone and directly rapidly cooling the withdrawn mixture to about room temperature to solidify the same and to form as a substantially dry homogeneous solid product chlorinated tri-sodium phosphate consisting essentially of tri-sodium phosphate, sodium chloride, water and at least about 3.25% by weight sodium hypochlorite.

11. A method of manufacturing chlorinated tri-sodium phosphate which comprises providing an aqueous solution containing sodium hydroxide and tri-sodium phosphate dissolved therein, the amount of water in said solution being less than sufficient to form dodecahydrate crystals with all the tri-sodium phosphate therein, sufficient to dissolve the sodium hydroxide and not sufficient to effect dissolution of all the sodium phosphate in the presence of the sodium hydroxide and the amount of sodium hydroxide in said solution being equivalent to an amount of sodium hypochlorite of at least about 3.25% by weight in the chlorinated tri-sodium phosphate product as produced herein, continuously introducing a stream of said solution into a chlorination zone maintained at a temperature in the range 70–100° C., continuously introducing gaseous chlorine into said chlorination zone to contact said stream therein, the chlorine being introduced into the chlorination zone in an amount at least stoichiometrically equivalent to the sodium hydroxide in the stream introduced thereinto, the chlorine reacting with the sodium hydroxide substantially instantly and completely within said chlorination zone to form sodium chloride and sodium hypochlorite, directly upon completion of the aforesaid chlorination reaction and within a period of time of up to about 15 seconds after said introducing of gaseous chlorine continuously withdrawing in liquid form the resulting reaction mixture containing tri-sodium phosphate, sodium chloride, sodium hypochlorite and water from the chlorination zone and directly rapidly cooling the withdrawn reaction mixture to about room temperature to solidify the same and to form as a substantially dry, homogeneous, solid material the aforesaid chlorinated tri-sodium phosphate product, said chlorinated tri-sodium phosphate product consisting essentially of tri-sodium phosphate, sodium chloride, water and at least about 3.25% by weight sodium hypochlorite.

12. A method of manufacturing chlorinated tri-sodium phosphate which comprises adding solid sodium hydroxide to a solution of tri-sodium phosphate having a density in the range 51–56° Baumé, the amount of sodium hydroxide added being in the range 4.0–5.0% by weight based on the resulting solution, said resulting solution, after the addition of sodium hydroxide, containing undissolved tri-sodium phosphate, the amount of water in said resulting solution being sufficient to dissolve the sodium hydroxide and not sufficient to effect dissolution of all the sodium phosphate in the presence of the sodium hydroxide, continuously introducing a stream of said resulting solution into a chlorination zone maintained at a temperature in the range 70–100° C., continuously introducing gaseous chlorine into said chlorination zone to contact said stream therein, the chlorine being introduced into the chlorination zone in an amount at least stoichiometrically equivalent to the sodium hydroxide in the stream introduced thereinto to form sodium chloride and sodium hypochlorite, the residence time of said stream within said chlorination zone being up to about 15 seconds sufficient to effect reaction between the chlorine and substantially all of the sodium hydroxide introduced thereinto, substantially immediately after completion of the chlorination reaction continuously withdrawing in liquid form the resulting reaction mixture containing tri-sodium phosphate, sodium chloride, sodium hypochlorite and water from the chlorination zone and directly immediately rapidly cooling the withdrawn reaction mixture to about room temperature to solidify the same and to form as a substantially dry, homogeneous, solid product chlorinated tri-sodium phosphate containing tri-sodium phosphate, sodium chloride, water and at least about 3.25% by weight sodium hypochlorite.

References Cited

UNITED STATES PATENTS

| | | | |
|---|---|---|---|
| 1,965,304 | 7/1934 | Adler | 252—99 X |
| 2,034,361 | 3/1936 | Sutton | 252—99 X |

LEON D. ROSDOL, *Primary Examiner.*

M. WEINBLATT, *Assistant Examiner.*